(12) United States Patent
Mitchell

(10) Patent No.: US 10,391,808 B2
(45) Date of Patent: Aug. 27, 2019

(54) PEN HOLDER

(71) Applicant: Wacom Co., Ltd., Saitama (JP)

(72) Inventor: Giles Thomas Mitchell, Tokyo (JP)

(73) Assignee: WACOM CO., LTD., Saitama (JP)

( * ) Notice: Subject to any disclaimer, the term of this patent is extended or adjusted under 35 U.S.C. 154(b) by 125 days.

(21) Appl. No.: 15/782,442

(22) Filed: Oct. 12, 2017

(65) Prior Publication Data

US 2018/0154679 A1    Jun. 7, 2018

(30) Foreign Application Priority Data

Dec. 1, 2016  (JP) ................................ 2016-233928

(51) Int. Cl.
| | |
|---|---|
| *B43K 8/22* | (2006.01) |
| *B43K 23/00* | (2006.01) |
| *B43K 23/04* | (2006.01) |
| *B43M 99/00* | (2010.01) |
| *B65D 85/28* | (2006.01) |
| *G06F 3/0354* | (2013.01) |

(52) U.S. Cl.
CPC ............... *B43K 23/04* (2013.01); *B43K 8/22* (2013.01); *B43K 23/001* (2013.01); *B43M 99/007* (2013.01); *G06F 3/03545* (2013.01); *B43M 99/008* (2013.01); *B65D 85/28* (2013.01); *G06F 2200/1632* (2013.01)

(58) Field of Classification Search
CPC .... B43K 23/001; B43K 23/002; B43K 23/02; B43K 23/04; B43K 29/20; B43K 8/22; B43M 99/007; B43M 99/008; G06F 2200/1632; G06F 3/03545

USPC ........... 15/435, 444, 445; 211/69.1; 401/131
See application file for complete search history.

(56) References Cited

U.S. PATENT DOCUMENTS

| | | | | | |
|---|---|---|---|---|---|
| 545,497 | A | * | 9/1895 | Hayden ................ | B43K 23/001 211/69.8 |
| 831,394 | A | * | 9/1906 | Webb ................... | B43M 99/003 211/69.5 |
| 3,428,380 | A | * | 2/1969 | Danjczek ............. | B43M 99/007 206/371 |
| 3,502,224 | A | * | 3/1970 | Heinze .................. | B43K 23/04 211/69.8 |
| 4,515,492 | A | * | 5/1985 | Shan ...................... | A45C 11/34 401/52 |
| 4,548,325 | A | * | 10/1985 | Hojer ................... | B43M 99/007 211/69.5 |
| 4,699,536 | A | * | 10/1987 | Berman ............... | B43K 23/002 401/195 |

(Continued)

FOREIGN PATENT DOCUMENTS

| | | |
|---|---|---|
| JP | D1372747 S | 11/2009 |
| JP | 2015-51242 A | 3/2015 |

*Primary Examiner* — Patrick M. Buechner
(74) *Attorney, Agent, or Firm* — Seed IP Law Group LLP

(57) ABSTRACT

A pen holding device configured to hold an electronic pen which has a first core that is elongated and is replaceable. The pen holding device includes a casing having an electronic pen holder that is configured to hold the electronic pen in an erect state or a laid state, and at least one refill core holder which is provided inside the casing and is configured to grasp a second core, which is a refill core for the electronic pen, in a direction different from a longitudinal direction of the electronic pen when the electronic pen is held in the erect state.

20 Claims, 7 Drawing Sheets

(56) References Cited

U.S. PATENT DOCUMENTS

| | | | | |
|---|---|---|---|---|
| 4,865,285 A | * | 9/1989 | Gaggianese | B43M 99/004 248/309.4 |
| 4,884,701 A | * | 12/1989 | Nymark | B25H 3/04 211/69.8 |
| 5,123,548 A | * | 6/1992 | Milne | B43K 23/002 211/69.5 |
| 5,644,516 A | * | 7/1997 | Podwalny | G06F 1/1626 345/901 |
| 6,200,052 B1 | * | 3/2001 | Pitaniello | B43K 23/02 401/131 |
| 6,246,577 B1 | * | 6/2001 | Han | G06F 1/1632 345/179 |
| 6,305,864 B1 | * | 10/2001 | Nguyen | B43K 23/04 15/435 |
| 6,575,649 B1 | * | 6/2003 | Kuan-Hsiung | B43K 23/02 211/69.5 |
| 6,735,825 B1 | * | 5/2004 | Berman | B43K 23/001 211/69.1 |
| 6,745,907 B2 | * | 6/2004 | Kjelgaard | B43M 99/006 206/1.7 |
| D504,911 S | * | 5/2005 | Ng | D19/135 |
| D525,306 S | * | 7/2006 | Hirota | D19/84 |
| D568,402 S | * | 5/2008 | Mori | D19/135 |
| D570,416 S | * | 6/2008 | Hackenberg | D19/83 |
| D624,966 S | | 10/2010 | Crisp | |
| D744,486 S | * | 12/2015 | Arai | D14/411 |
| 2006/0132468 A1 | * | 6/2006 | Lev | G06F 1/1613 345/179 |
| 2006/0226324 A1 | * | 10/2006 | Pitaniello | B43K 23/001 248/311.2 |
| 2006/0243607 A1 | * | 11/2006 | Yeh | B43K 23/001 206/214 |
| 2007/0125728 A1 | * | 6/2007 | Mak | B25H 3/003 211/60.1 |
| 2007/0181512 A1 | * | 8/2007 | Ting | B43K 23/001 211/10 |
| 2009/0013566 A1 | * | 1/2009 | Cetera | A45C 11/34 40/124.06 |
| 2009/0035050 A1 | * | 2/2009 | Ramos | A47G 19/24 401/131 |
| 2011/0081191 A1 | * | 4/2011 | Monzo | B43K 8/003 401/195 |
| 2014/0247006 A1 | * | 9/2014 | Yu | H02J 7/025 320/108 |
| 2016/0023500 A1 | * | 1/2016 | Wang | B43K 23/04 401/131 |
| 2016/0245454 A1 | * | 8/2016 | Wartersian | A47G 21/02 |
| 2016/0245456 A1 | * | 8/2016 | Wartersian | B43L 19/0056 |

* cited by examiner

PEN HOLDER

BACKGROUND

Technical Field

The present disclosure relates to a pen holder device, particularly to a pen holder device configured to be able to accommodate refill cores therein.

In recent years, attention has been paid to an electronic pen for writing or drawing characters or figures onto a position detection device such as a digitizer or a tablet. An electronic pen is a small-sized electronic apparatus having an elongated shape, and, in general, it is used in the state of being held by a hand, like a conventional type writing instrument such as a pencil and a ballpoint pen.

Meanwhile, the electronic pen has a problem in that it is liable to be lost when let alone, since it is small in size. In view of this, in recent years, pen holders for exclusive use for electronic pens have come to be sold. Japanese Design Registration No. 1372747 discloses an example of such pen holders.

The pen holder described in Japanese Design Registration No. 1372747 is configured to be able to accommodate refill cores therein. Specifically, the pen holder includes an upper casing and a lower casing, and refill cores are accommodated in a vertically erect state on an upper side in the upper casing. In the state where the upper casing and the lower casing are joined to each other, the refill cores are accommodated in the casing, and would not fall off even if the pen holder is inverted upside down.

Japanese Patent Laid-open No. 2015-051242 discloses an invention concerning a thermochromic writing instrument set that accommodates thermochromic writing instruments. The thermochromic writing instrument set according to the invention has a main body and an upper lid, and thermochromic writing instruments are accommodated in a laterally oriented state in the main body.

The pen holder described in Japanese Design Registration No. 1372747 has an enlarged overall height because the refill cores should be accommodated therein. Therefore, this pen holder has a problem that it is difficult for the pen holder to be accommodated in a drawer of a desk or the like when not used as a pen holder.

BRIEF SUMMARY

Accordingly, there is a need for a pen holding device such that a reduction in the height thereof can be realized while refill cores are accommodated therein.

In order to attain the object described above, according to the present disclosure, a pen holding device configured to hold an electronic pen, which has a first core that is elongated and is replaceable, is provided. The pen holding device includes: a casing having an electronic pen holder that is configured to hold the electronic pen in an erect state or a laid state; and at least one refill core holder which is provided inside the casing and is configured to grasp a second core, which is a refill core for the electronic pen, in a direction different from a longitudinal direction of the electronic pen when the electronic pen is held in the erect state.

According to the present disclosure, the refill core holder grasps the refill core in a direction different from the longitudinal direction of the electronic pen in the erect state. Therefore, a reduction in the height of the casing can be realized, as compared to a case where the refill core is accommodated in the same direction as the electronic pen in the erect state like in the case of the pen holder described in Japanese Design Registration No. 1372747.

In the pen holding device as above, a configuration may be adopted wherein the electronic pen holder includes an opening into which a pen tip of the electronic pen is inserted and which holds the electronic pen in the erect state, and the at least one refill core holder grasps the refill core in an oblique direction as viewed from the longitudinal direction of the electronic pen when the electronic pen is held in the erect state. According to this configuration, a reduction in the horizontal width of the casing can be easily achieved, as compared to a case where the refill core is grasped horizontally.

In the pen holding device as above, the casing may have a lid formed with the electronic pen holder at least on an upper surface thereof, and the at least one refill core holder may be disposed on a lower surface side of the lid. According to this configuration, the user can lift up the lid and perform detachment and attachment of the refill core at a position nearby.

In the pen holding device as above, a configuration may be adopted wherein the lid has an outer shell constituting an outer surface of the casing, and a cover covering a lower surface of the outer shell, and the at least one refill core holder includes a recess provided in the cover. According to this configuration, the refill core holder can grasp the refill core by clamping one end of the refill core, inserted in the recess, between the cover and the outer shell.

In the pen holding device as above, the at least one refill core holder may further include a groove provided in the cover, and the recess may be provided at a first end of the groove corresponding thereto. According to this configuration, the groove functions as a guide, so that accommodation of the refill core into the refill core holder is facilitated.

In the pen holding device as above, the opening may be provided in a center of the casing as viewed on a top, plan-view basis, and the groove may be formed such as to extend in a direction from the opening toward an outside of the lid as viewed on a top, plan-view basis. According to this configuration, the groove is disposed radially, so that detachment and attachment of the refill core by the user is facilitated.

In the pen holding device as above, the recess may be provided at one end, near the opening, of the groove corresponding thereto. According to this configuration, the refill core can be detached and attached through an outer edge of the lid, so that detachment and attachment of the refill core by the user is further facilitated.

In the pen holding device as above, the cover may have a tapered portion formed in a mortar shape with the opening as a center, and the groove may be provided in the tapered portion. According to this configuration, the refill core can be put in and out in an oblique direction, so that detachment and attachment of the refill core by the user is further facilitated.

In the pen holding device as above, a configuration may be adopted wherein the recess is formed in an extending direction of the groove from one end, near the opening, of the groove, and the recess is part of a hollow cylinder, and an axis of the hollow cylinder is parallel to a top surface of a protuberance. According to this configuration, one end of the refill core inserted in the recess can be clamped between the cover and the outer shell.

In the pen holding device as above, the outer shell may further have a recess having an inner surface continuous with the top surface of the protuberance. According to this configuration, the area of contact between the refill core and the cover in the recess can be made larger.

The pen holding device as above may further include a flat portion provided between the tapered portion and an outer edge of the lid, and a second end of the groove may open in the flat portion. According to this configuration, an end portion of the refill core can be easily grasped, so that detachment and attachment of the refill core by the user is further facilitated.

In the pen holding device as above, the outer shell may have a protuberance extending along the groove, and a top surface of the protuberance may constitute a bottom surface of the groove. This configuration ensures that the depth of the groove can be constant.

The pen holding device as above may include a plurality of the refill core holders, and the plurality of refill core holders may be disposed surrounding the opening as viewed on a top, plan-view basis. According to this configuration, the plurality of refill core holders can be disposed in the periphery of the opening.

In the pen holding device as above, each of the plurality of refill core holders may have a groove configured such that the refill core can be accommodated therein, and the respective grooves of the plurality of refill core holders may be disposed radially with the opening as a center as viewed on a top, plan-view basis. According to this configuration, detachment and attachment of the refill core by the user is facilitated.

In the pen holding device as above, a configuration may be adopted wherein the casing has a main body, and a lid which is configured to be attachable to and detachable from the main body and is formed with the opening, the lid has a tapered portion formed in a mortar shape with the opening as a center, and the respective grooves of the plurality of refill core holders are provided in the tapered portion. According to this configuration, the refill core can be put in and out in an oblique direction, so that detachment and attachment of the refill core by the user is further facilitated.

In the pen holding device as above, the at least one refill core holder may grasp the refill core such that, when the pen holding device is placed on a horizontal surface, a longitudinal direction of the refill core is parallel to a horizontal direction. According to this configuration, a reduction in the height of the casing can be realized, as compared to the case where the refill core is accommodated in the state of being oriented in the vertical direction.

In the pen holding device as above, a configuration may be adopted wherein the casing has a lid formed with the electronic pen holder at least on an upper surface side thereof, the lid has an outer shell constituting an outer surface of the casing, and a cover covering a lower surface of the outer shell, the cover is provided with an outer edge erected downwardly along an outer edge of the cover, and a projection projecting downwardly from a central portion of the cover, the outer edge is formed with a plurality of first cutouts, the projection is formed with a plurality of second cutouts, and the second cutouts are in one-to-one correspondence with the first cutouts, and each of the plurality of refill core holders is composed of one set of the first and second cutouts corresponding to each other. According to this configuration, the first and second cutouts function as a guide, so that accommodation of the refill core into the refill core holder is facilitated.

According to the present disclosure, the refill core holder grasps the refill core in a direction different from the longitudinal direction of the electronic pen in the erect state. Therefore, a reduction in the height of the casing can be realized, as compared to the case where the refill core is accommodated in the same direction as the electronic pen in the erect state like in the case of the pen holder described in Japanese Design Registration No. 1372747.

DETAILED DESCRIPTION OF THE PREFERRED EMBODIMENT

An embodiment of the present disclosure will be described below, referring to the accompanying drawings.

Figure 1:
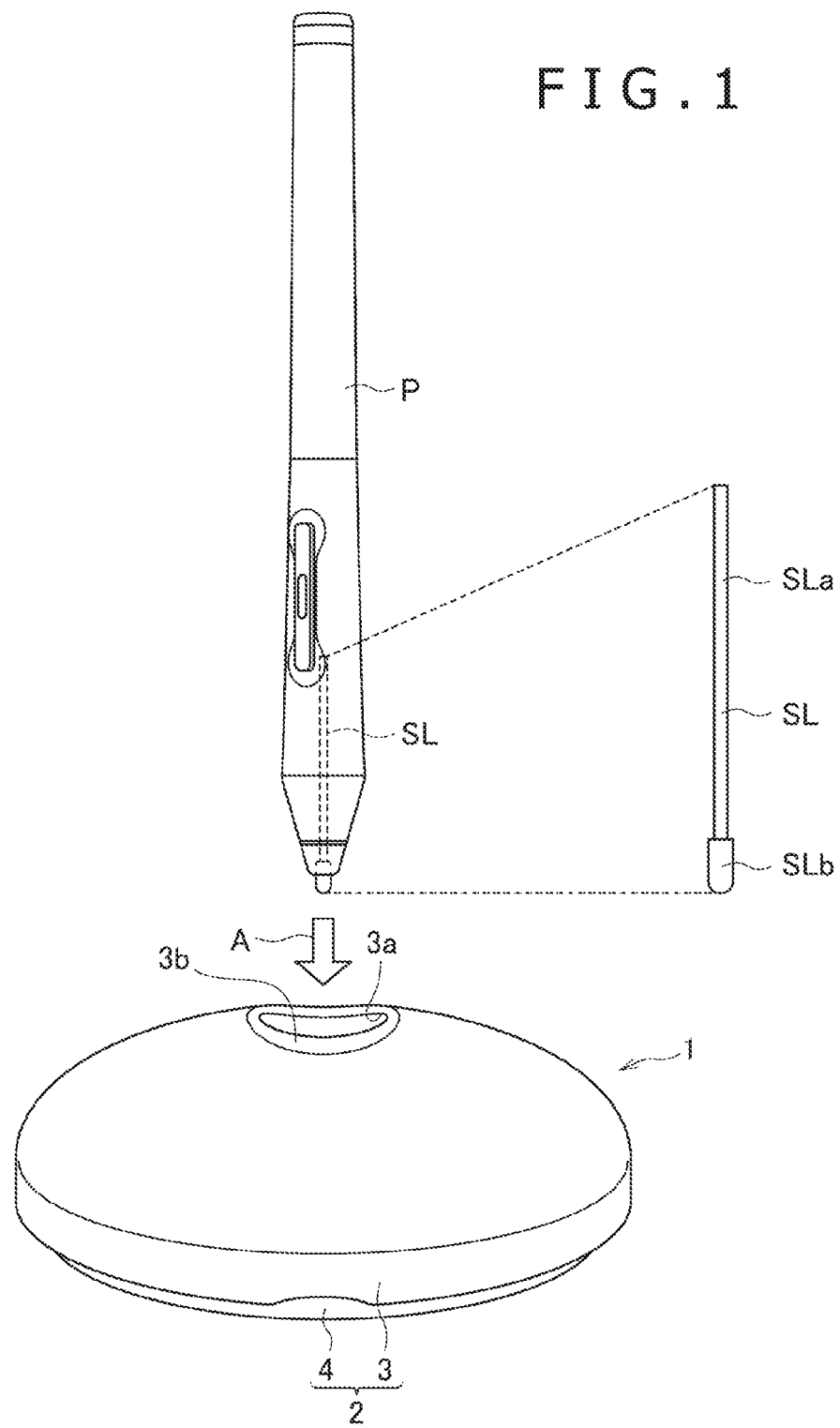
FIG. 1 is a perspective view depicting a pen holding device in a state of use according to an embodiment of the present disclosure.

FIG. 1 is a perspective view depicting a pen holding device 1 in a state of use holding device 1 according to an embodiment of the present disclosure. As depicted in the figure, the pen holding device 1 is configured to have a casing 2 which includes a main body 4 and a lid 3 configured to be attachable to and detachable from the main body 4. The lid 3 has a hemispherical shape flattened in a thickness direction, and is formed at its upper surface with an opening 3a and a recess 3b which each serve as an electronic pen holder for holding an electronic pen.

The pen holding device 1 is normally used in a state of being placed on a horizontal surface, with the main body 4 on the lower side and with the lid 3 on the upper side, as depicted in FIG. 1. When an electronic pen P is moved in the direction of arrow A to insert a pen tip of the electronic pen P into the opening 3a, in the normal use state, the pen holding device 1 supports the electronic pen P by inside surfaces of recesses 13a and 4a (see FIG. 5B) which communicate with the opening 3a as will be described later. By this, the electronic pen P is set in an erect state.

In addition, the pen holding device 1 is configured such that the electronic pen P can be supported thereby not only in an erect state but also in a horizontally directed state (laid state). A structure for realizing this is the recess 3b. As will be depicted in FIG. 2A described later, the recess 3b is an elliptically shaped recess provided in the center of an upper surface of the lid 3. A bottom surface of the recess 3b is formed in a curved surface shape conforming to a side surface shape of the electronic pen P, whereby the electronic pen P can be laid in a horizontally directed state on the recess 3b. Note that the opening 3a is provided in the center of the recess 3b.

The pen tip of the electronic pen P is composed of a refill core SL depicted in the figure, which is replaceable. As depicted in FIG. 1, the refill core SL has a configuration wherein a pen tip portion SLb is formed at an end portion on one side of a rod-shaped member SLa. The pen tip portion SLb has a hemispherical shape, and functions as a pen tip of the electronic pen P. Mounting of the refill core SL onto the electronic pen P is conducted by inserting the rod-shaped member SLa into a tip of the electronic pen P, starting from an end portion of the rod-shaped member SLa. In addition, detachment of the refill core SL from the electronic pen P is conducted by a method wherein the pen tip portion SLb exposed at the tip of the electronic pen P is grasped with a specialized tool or tweezers or the like and the refill core SL is drawn out. Though not depicted in FIG. 1, the pen holding device 1 is configured in such a manner that a plurality of refill cores SL can be accommodated therein, and the present disclosure teaches a configuration of the pen holding device 1 for realizing this accommodation. The configuration of the pen holding device 1 will be described in detail below, referring to FIGS. 2A to 7. Note that the "upper (side)" and the "lower (side)" in the following description mean the "upper (side)" and the "lower (side)" in the normal use state illustrated in FIG. 1, unless specified otherwise.

Figure 2A:
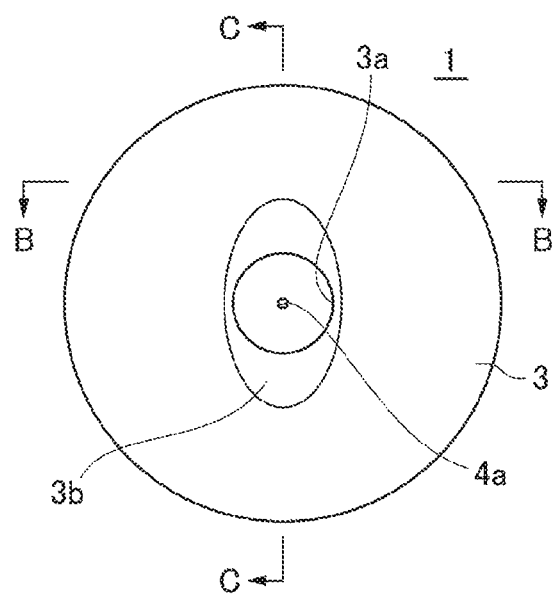
FIG. 2A is a top, plan view of the pen holding device.
Figure 2B:
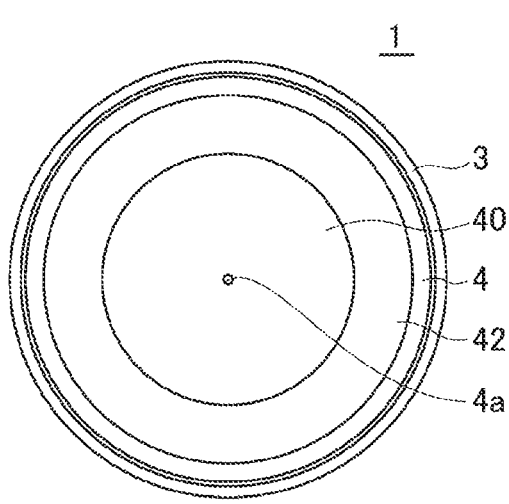
FIG. 2B is a bottom view of the pen holding device.
Figure 2C:
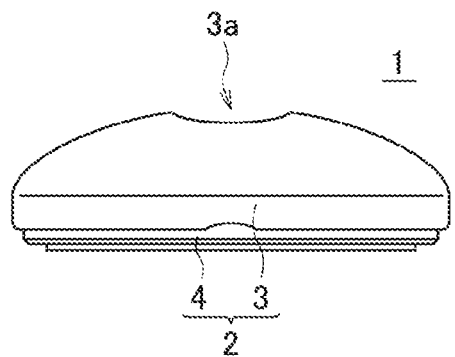
FIG. 2C is a side view of the pen holding device, as viewed from the lower side of FIG. 2A.
Figure 2D:
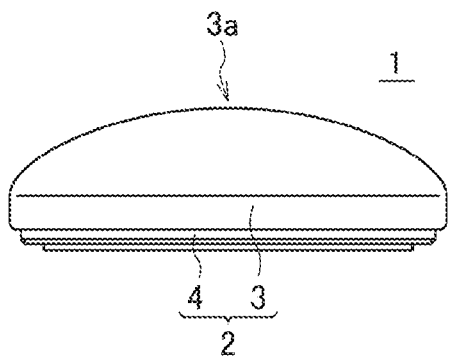
FIG. 2D is a side view of the holding device, as viewed from the right side of FIG. 2A.
Figure 3A:
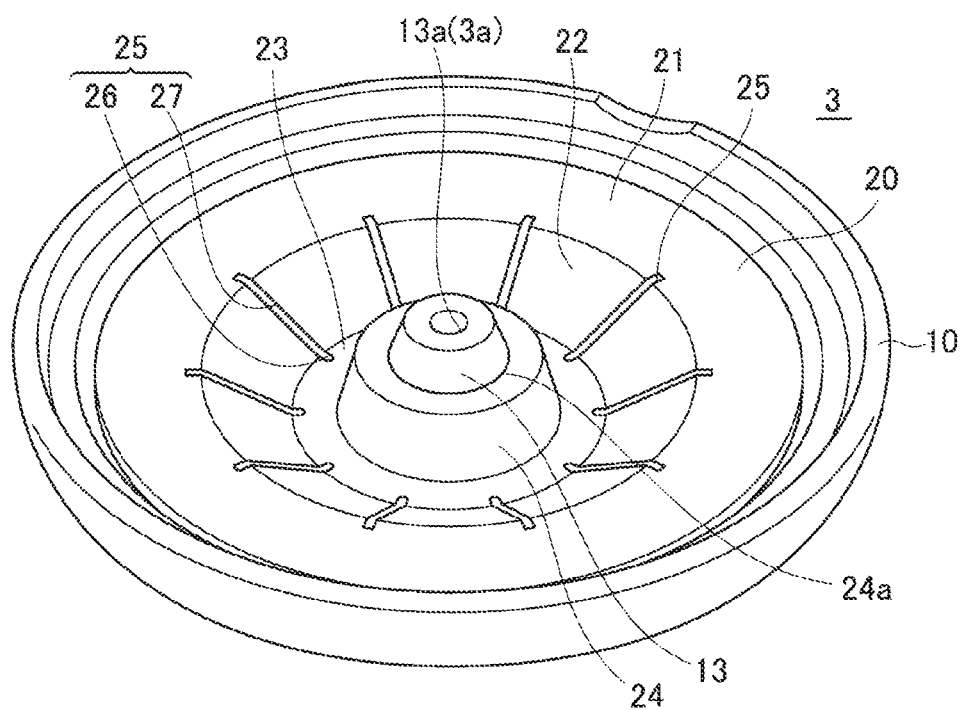
FIG. 3A is a perspective view of a lid in a detached state from a main body, as viewed from a lower side.
Figure 3B:
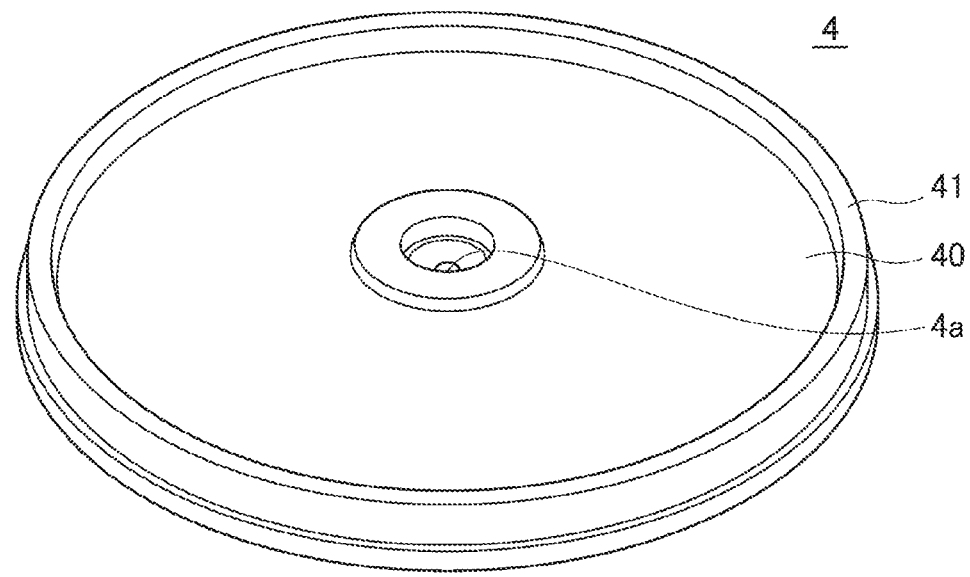
FIG. 3B is a perspective view of the main body in a detached state from the lid.
Figure 4A:
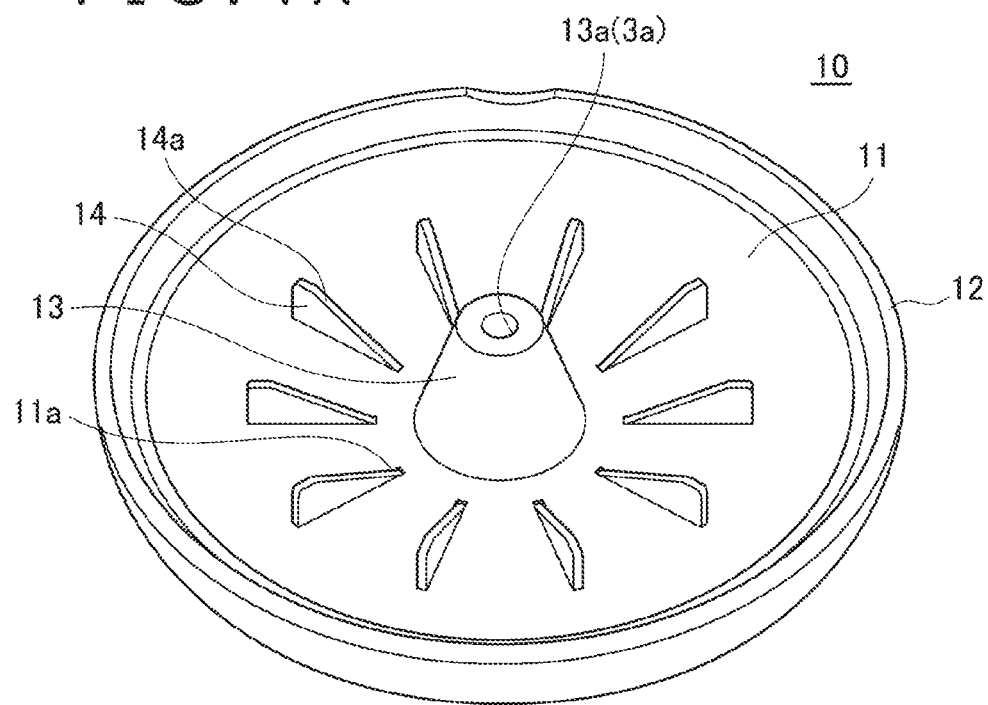
FIG. 4A is a perspective view of an outer shell constituting the lid, as viewed from a lower side.
Figure 4B:
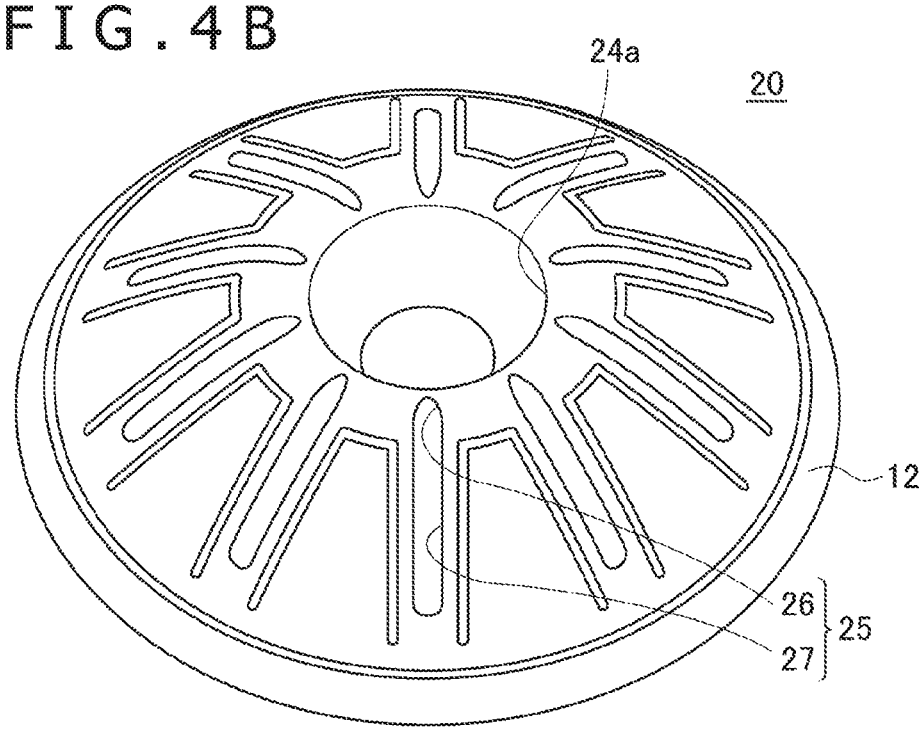
FIG. 4B is a perspective view of a cover constituting the lid, as viewed from an upper side.
Figure 5A:
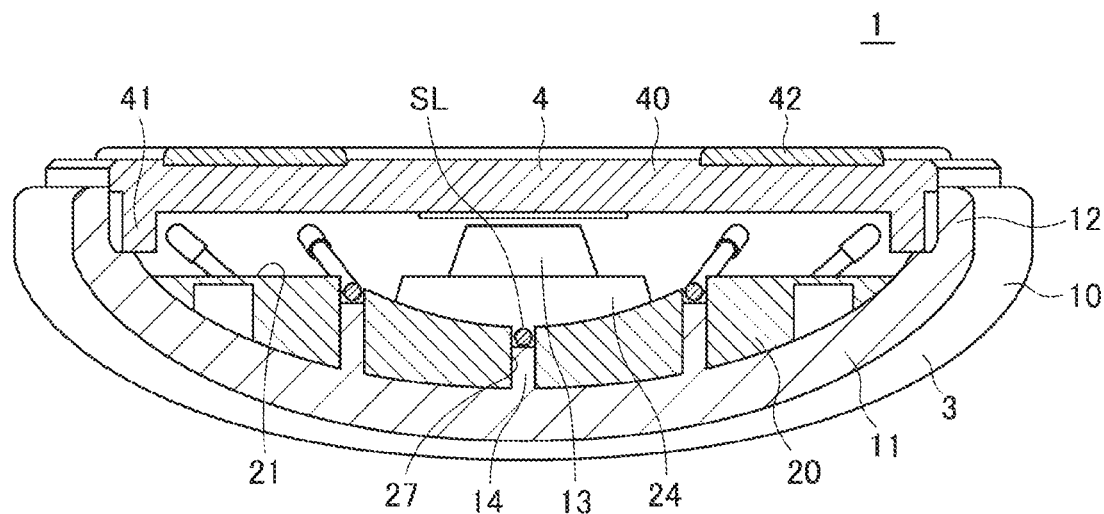
FIG. 5A is a sectional view of the pen holding device, corresponding to line B-B of FIG. 2A.
Figure 5B:
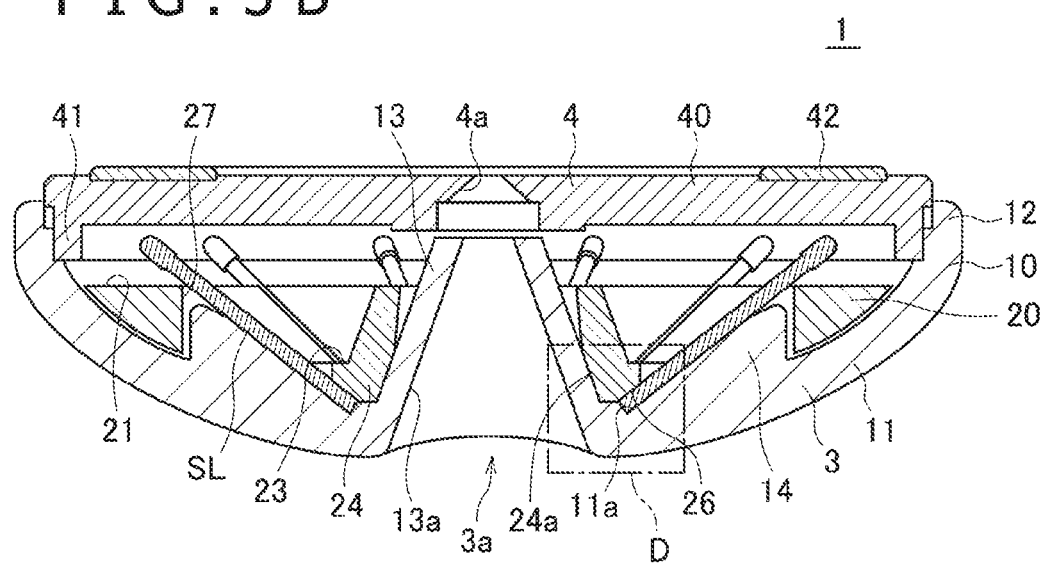
FIG. 5B is a sectional view of the pen holding device, corresponding to line C-C of FIG. 2A.
Figure 6:
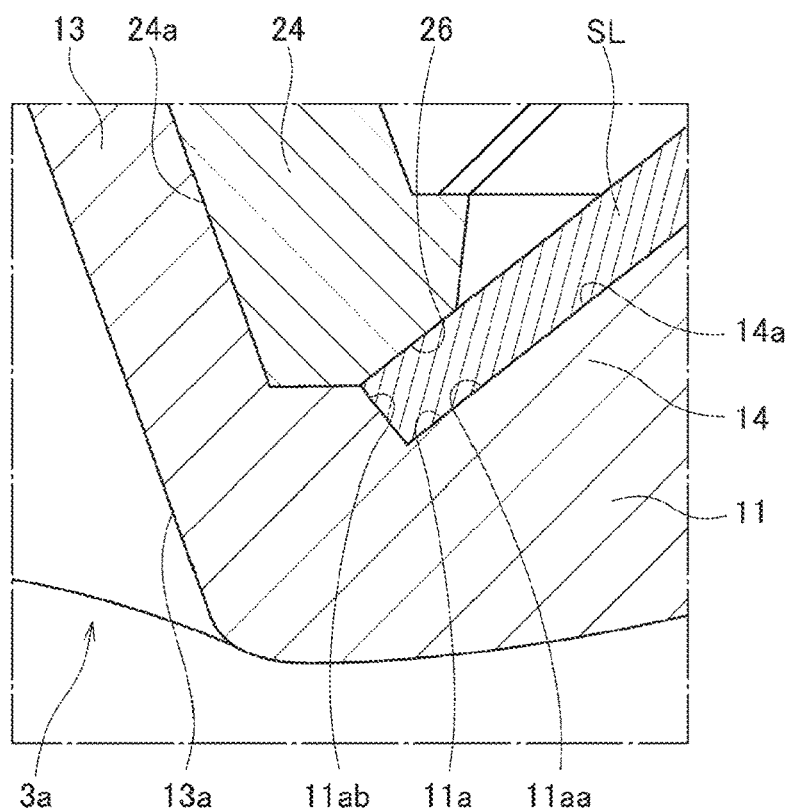
FIG. 6 is an enlarged view of region D depicted in FIG. 5B.
Figure 7:
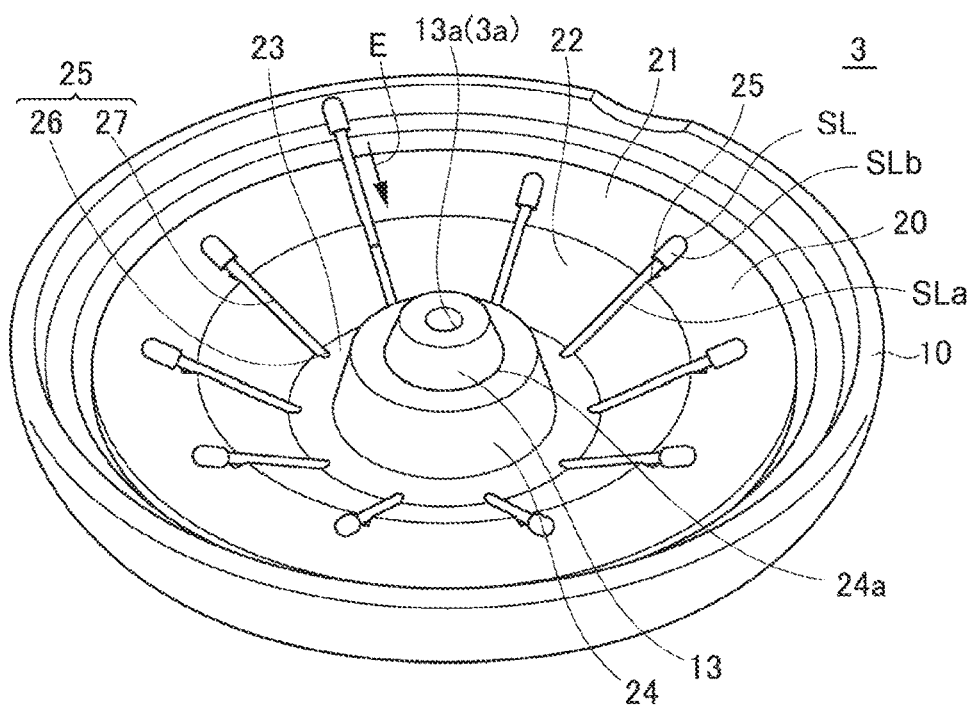
FIG. 7 is a perspective view of the lid in a state where refill cores for an electronic pen are mounted thereon, as viewed from a lower side.

FIG. 2A is a top view of the pen holding device 1, and FIG. 2B is a bottom view of the pen holding device 1. In addition, FIG. 2C is a side view of the pen holding device 1, as viewed from the lower side of FIG. 2A, and FIG. 2D is a side view of the pen holding device 1, as viewed from the right side of FIG. 2A. Note that though not illustrated, a side view of the pen holding device 1 as viewed from the upper side of FIG. 2A is the same as FIG. 2C, and a side view of the pen holding device 1 as viewed from the left side of FIG. 2A is the same as FIG. 2D. FIG. 3A is a perspective view of the lid 3 in a detached state from the main body 4, as viewed from a lower side, and FIG. 3B is a perspective view of the main body 4 in a detached state from the lid 3. FIG. 4A is a perspective view of an outer shell 10 constituting the lid 3, as viewed from a lower side, and FIG. 4B is a perspective view of a cover 20 constituting the lid 3, as viewed from an upper side. FIG. 5A is a sectional view of the pen holding device 1, corresponding to line B-B of FIG. 2A, and FIG. 5B is a sectional view of the pen holding device 1, corresponding to line C-C of FIG. 2A. FIG. 6 is an enlarged view of region D depicted in FIG. 5B. FIG. 7 is a perspective view of the lid 3 in a state where refill cores SL are mounted thereon, as viewed from a lower side.

First, referring to FIG. 3A, the lid 3 includes the outer shell 10 constituting an outer surface of the casing 2, and the cover 20 covering a lower surface (a surface on the main body 4 side) of the outer shell 10.

The outer shell 10 is formed of a material that is light in weight but is not easily deformed, for example, a rigid plastic. As illustrated in FIG. 4A, the outer shell 10 includes a curved surface portion 11 having the above-mentioned hemispherical surface flattened in the thickness direction, an outer edge 12 erected downwardly along an outer edge of the curved surface portion 11, a projection 13 provided at a central portion of the curved surface portion 11, and a plurality of protuberances 14 provided in the periphery of the projection 13.

The curved surface portion 11 is an inner wall portion of the lid 3 that is formed in the above-mentioned flattened hemispherical shape. As depicted in FIG. 4A, the curved surface portion 11 is formed in a tapered shape from a central portion toward the outer edge 12.

The outer edge 12 has a screw thread formed at an inside surface thereof. This screw thread is for screw engagement with a screw thread provided at an outside surface of an outer edge 41 of the main body 4 which will be described later; by the screw engagement, the lid 3 and the main body 4 can be attached to and detached from each other.

The projection 13 projects downwardly from a central portion of the curved surface portion 11, and is provided therein with the recess 13a. As depicted in FIG. 5B, the recess 13a is composed of a through-hole formed in an inverted truncated conical shape with a diameter gradually decreasing from an upper end (a lower end in FIG. 5B) toward a lower end. The aforementioned opening 3a is composed of an upper end of the recess 13a. As the recess 13a has the inverted truncated conical shape, the projection 13 also has an inverted truncated conical shape, as illustrated in FIGS. 4A and 5B. As depicted in FIG. 5B, the height of the projection 13 is set at such a level that a top surface of the projection 13 does not contact the main body 4.

As depicted in FIG. 4A, the plurality of protuberances 14 are disposed such as to surround the projection 13 (and, hence, the opening 3a) as viewed on a top, plan-view basis. More specifically, each of the protuberances 14 is formed to extend from the projection 13 toward the outer shell 10 as viewed from a lower side, and the protuberances 14 are disposed radially and at regular intervals, with the projection 13 as a center. The projection amount of each protuberance 14 is such that the protuberance 14 is at the same height as the curved surface portion 11 at a position closest to the projection 13 and that the projection portion increases at a fixed rate from that position toward the outside of the outer shell 10. In other words, a top surface 14a of each protuberance 14 depicted in FIG. 6 constitutes an inclined surface which approaches the curved surface portion 11 in going closer to the projection 13.

As depicted in FIG. 4A, the curved surface portion 11 is formed with a plurality of recesses 11a in one-to-one correspondence with the plurality of protuberances 14. Each recess 11a is disposed in the vicinity of an end portion on the projection 13 side of the corresponding protuberance 14. As depicted in FIG. 6, an inner surface of the recess 11a includes an inclined surface 11aa continuous with the top surface 14a of the protuberance 14, and an inclined surface 11ab orthogonal to the inclined surface 11aa.

Next, the cover 20 is formed of an elastic material such as an elastomer. As depicted in FIG. 3A, the cover 20 includes a first flat portion 21, a tapered portion 22, a second flat portion 23, a projection 24, and a plurality of refill core holders 25 at a lower surface (an upper surface in FIG. 3A) thereof. An upper surface of the cover 20 is formed in a curved surface shape conforming to the curved surface portion 11 of the outer shell 10 as depicted in FIG. 4B, and is adhered to the curved surface portion 11 of the outer shell 10 with an adhesive (not depicted), for example.

As depicted in FIG. 3A, the projection 24 is formed to project downwardly from the second flat portion 23. The projection 24 is provided therein with a recess 24a, as depicted in FIG. 5B. The recess 24a is a through-hole for passing the projection 13 therethrough, and has a shape conforming to an outer shape of the projection 13. The projection amount of the projection 24 is set to a height by which an upper end of the projection 13 projects from an upper end of the projection 24.

The tapered portion 22 is configured in a mortar shape with the projection 24 (and, hence, the opening 3a) as a center, and its height is set to be the same as the height of the projection 24. Therefore, the first flat portion 21 and a lower surface of the projection 24 form the same plane.

The plurality of refill core holders 25 are functional portions configured to be able to grasp refill cores SL in directions different from a longitudinal direction of the electronic pen P in the aforementioned erect state, and are provided in one-to-one correspondence with the protuberances 14 of the outer shell 10. Specifically, as illustrated in FIG. 3A, each of the refill core holders 25 includes a recess 26 that penetrates the second flat portion 23, and a groove 27 which is provided in the tapered portion 22, and one end of which communicates with the recess 26, whereas the other end of which opens in the first flat portion 21. Details of the structure of the refill core holder 25 will be described later in an integrated manner.

Next, as depicted in FIGS. 2B and 3B, the main body 4 includes a disk-shaped base portion 40, the outer edge 41 erected upward along an outer edge of the base portion 40, and an elastic portion 42 formed at a lower surface of the base portion 40. The base portion 40 and the outer edge 41 are formed of a metallic material higher in specific gravity than the material of the outer shell 10 and the cover 20. This is for preventing the casing 2 from tumbling down due to the weight of the electronic pen P. On the other hand, the elastic portion 42 is formed of an elastic member such as rubber. The elastic portion 42 plays an anti-skid role, and is formed in an annular shape with the recess 4a (described below) as a center, as illustrated in FIG. 2B.

The recess 4a is formed at a central portion of the base portion 40. As depicted in FIG. 5B, an upper half (a lower half in FIG. 5B) of the recess 4a is formed in a cylindrical shape having a constant diameter from an upper end to a lower end, whereas a lower half is formed in an inverted truncated conical shape whose diameter gradually decreases from an upper end to a lower end. As depicted in FIG. 5B, the recess 4a shares a center axis with the recess 13a. The pen tip of the electronic pen P inserted via the opening 3a passes through the recess 13a, to fit to the inverted truncated conical portion constituting the lower half of the recess 4a.

The outer edge 41 has a screw thread formed at an outside surface thereof. This screw thread makes screw engagement with the screw thread provided at the inside surface of the outer edge 12 of the outer shell 10, and, therefore, functions to provide a configuration wherein the lid 3 can be attached to and detached from the main body 4.

The foregoing is a general outline of the configuration of the pen holding device 1. Now, the structure of the refill core holders 25 will be described in detail below.

As depicted in FIG. 3A, the grooves 27 of the refill core holders 25 are disposed in such a manner as to surround the projection 24 (and, hence, the opening 3a) as viewed on a top, plan-view basis. More specifically, each groove 27 is formed to extend in a direction from the projection 24 toward the outside of the cover 20 as viewed on a top, plan-view basis, and the grooves 27 are disposed radially and at regular intervals with the projection 24 as a center. This layout is the same as the layout of the protuberances 14 of the outer shell 10, and each protuberance 14 extends along the corresponding groove 27.

Each groove 27 is formed to penetrate the tapered portion 22, as depicted in FIG. 4B, and the corresponding protuberance 14 is fitted therein, as depicted in FIG. 5A. A specific value of the projection height of each protuberance 14 from the curved surface portion 11 is set in such a manner that in the case where the protuberance 14 is fitted in the groove 27, the distance from a top surface of the protuberance 14 thus fitted to a surface of the tapered portion 22 (namely, the depth of the groove 27 when the top surface of the protuberance 14 is regarded as a bottom surface) becomes constant over the whole length of the groove 27. In addition, the width of each groove 27 is set to a value slightly larger than the diameter of the rod-shaped member SLa of the refill core SL.

The recess 26 of each refill core holder 25 is a through-hole formed to obliquely penetrate the cover 20 from one end, near the projection 24 (and, hence, the opening 3a), of the corresponding groove 27. As illustrated in FIG. 6, in the case where the recess 26 is regarded as part of a hollow cylinder, the axis of the hollow cylinder is parallel to the top surface 14a of the corresponding protuberance 14 and the inclined surface 11aa. In addition, the diameter of the hollow cylinder is set to a value slightly larger than the diameter of the rod-shaped member SLa.

Here, a method of accommodating the refill core SL into the refill core holder 25 will be described referring to FIG. 7. A user intending to accommodate the refill core SL into the refill core holder 25 holds the pen tip portion SLb of the refill core SL, as depicted in FIG. 7, and slides the rod-shaped member SLa into the groove 27 via the other end (an end portion opening in the first flat portion 21) of the groove 27, along the direction of arrow E in FIG. 7. Then, the other-side end portion (an end portion on the side opposite to the pen tip portion SLb) of the rod-shaped member SLa is moved through the recess 26 to the recess 11a, and is finally put into contact with the inclined surface 11ab in the recess 11a depicted in FIG. 6. In this instance, the longitudinal direction of the refill core SL is parallel to an oblique direction as viewed from the longitudinal direction of the electronic pen P in the erect state (the vertical direction). Therefore, a reduction in the height of the casing 2 is realized, as compared to the case where the refill core SL is accommodated in a state in which its longitudinal direction is parallel to the vertical direction. In addition, a reduction in the horizontal width of the casing 2 can be achieved, as compared to the case where the refill core SL is accommodated in a state in which its longitudinal direction is parallel to a horizontal direction.

Besides, of the refill core SL accommodated in the refill core holder 25, the part located in the recess 26 and the recess 11a is clamped between the cover 20 and the outer shell 10 and is grasped with a constant force. A main component of this force is a frictional force between the refill core SL and the cover 20, and has an efficacy particularly in the case where the lid 3 is placed in such a manner that the cover 20 is on the lower side. This is because the refill core SL comes in contact with the cover 20 due to the weight thereof. Therefore, even if the lid 3 is lifted up with the cover 20 on the lower side, the refill core SL is prevented from slipping down, and a state in which the refill core SL is grasped in the refill core holder 25 is maintained. In other words, according to the structure of the refill core holder 25, falling off (slipping off) of the refill core SL is prevented.

As has been described above, according to the pen holding device 1 in this embodiment, the refill core holder 25 grasps the refill core SL in a direction different from the longitudinal direction of the electronic pen P in the erect state (the vertical direction), and, therefore, a reduction in the height of the casing 2 can be realized, as compared to the case where the refill core SL is accommodated in the same direction as the electronic pen in the erect state like in the case of the pen holder described in Japanese Design Registration No. 1372747.

In addition, according to the pen holding device 1 in this embodiment, the refill core SL is grasped in an oblique direction as viewed from the longitudinal direction of the electronic pen P in the erect state, and, therefore, a reduction in the horizontal width of the casing 2 is easily achieved, as compared to the case where the refill core SL is grasped in the state of being oriented in a horizontal direction.

Furthermore, according to the pen holding device 1 in this embodiment, the refill core holder 25 is disposed not at the main body 4 but on the lower surface side of the lid 3, and, therefore, the user can detach the lid 3 from the main body 4, lift up the lid 3, and perform detachment and attachment of the refill core SL at a position nearby. Note that although the refill core SL may slip off the lid 3 where the refill core holder 25 is disposed on the lower surface side of the lid 3 in this way, the pen holding device 1 according to this embodiment ensures that the refill core SL is grasped by the structure of the refill core holder 25 and, therefore, the refill core SL is prevented from slipping off.

Specifically, the recess 26 is formed in such a manner that the recess 26 obliquely penetrates the cover 20 from an end, near the opening 3a, of the groove 27 and that in the case where the recess 26 is regarded as part of a hollow cylinder, the axis of the hollow cylinder is parallel to the top surface 14a of the protuberance 14. Therefore, one end of the refill core SL inserted in the recess 26 can be clamped between the cover 20 and the outer shell 10, and the refill core SL can be grasped with the frictional force between the cover 20 and the refill core SL. Further, since the outer shell 10 is provided with the recess 11a having an inside surface (inclined surface 11aa) continuous with the top surface 14a of the protuberance 14, the area of contact between the refill core SL and the cover 20 in the recess 26 can be made larger.

In addition, according to the pen holding device 1 in this embodiment, detachment and attachment of the refill core SL by the user is facilitated, by at least one of the configuration wherein the refill core holders 25 are disposed radially, the configuration wherein each recess 26 is provided at one end, near the opening 3a, of the corresponding groove 27, the configuration wherein the cover 20 is provided with the tapered portion 22 and the refill core SL is grasped along the tapered portion 22, and the configuration wherein the other end of the groove 27 opens in the first flat portion 21.

Besides, according to the pen holding device 1 in this embodiment, the outer shell 10 is provided with the protuberances 14, and the top surface 14a of each protuberance 14 constitutes a bottom surface of the groove 27, so that the depth of the groove 27 can be made constant.

While a preferred embodiment of the present disclosure has been described above, the present disclosure is not to be limited to or by such an embodiment, and, naturally, the present disclosure can be carried out in various modes without departing from the scope of the gist thereof.

For example, while the plurality of refill core holders 25 are provided in the pen holding device 1 in the above-described embodiment, only one refill core holder 25 may be provided.

In addition, while the refill cores SL are grasped in oblique directions as viewed from the longitudinal direction of the electronic pen P in the erect state in the above-described embodiment, an effect of reducing the height of the casing 2 can also be obtained by a configuration wherein the refill cores SL are grasped in the state of being oriented in horizontal directions.

Figure 8A:
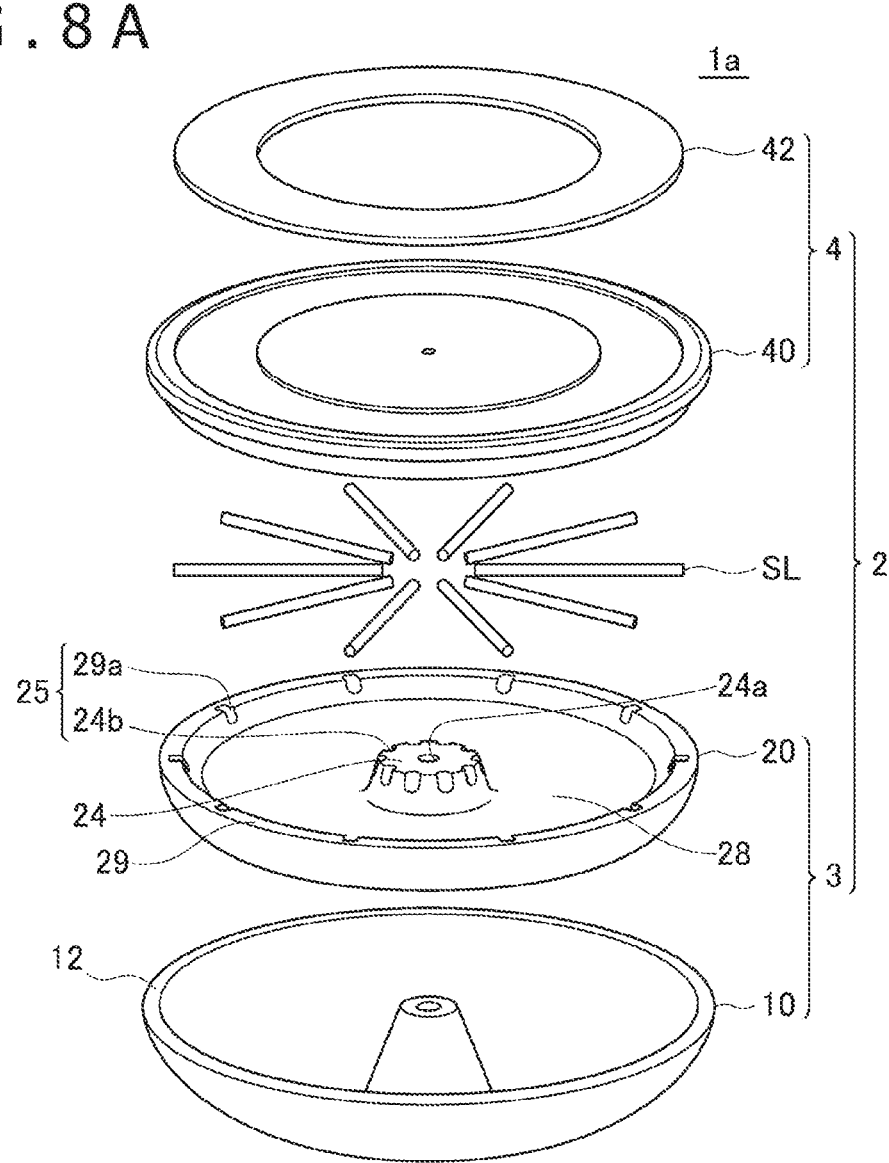
FIG. 8A is an exploded perspective view of a pen holding device according to an embodiment of the present disclosure.
Figure 8B:
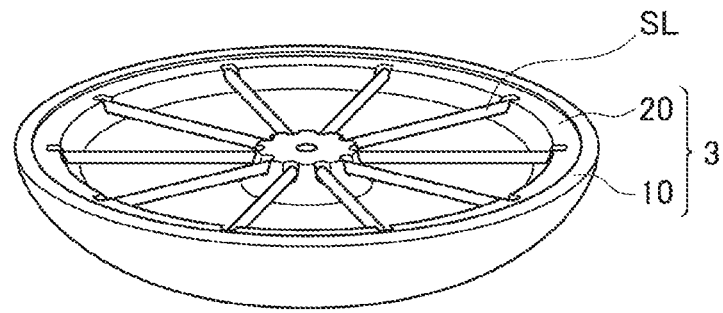
FIG. 8B is a perspective view of a lid of the pen holding device (in a state where the refill cores for the electronic pen are mounted thereon).

FIG. 8A is an exploded perspective view of a pen holding device 1a according to an embodiment of the present disclosure, and FIG. 8B is a perspective view of a lid 3 of the pen holding device 1a (in a state where the refill cores SL for the electronic pen P are mounted thereon). The pen holding device 1a is an example obtained by modifying the structure of the pen holding device 1 in such a manner that the refill cores SL can be grasped in the state of being oriented in horizontal directions.

The difference in structure between the pen holding device 1a and the pen holding device 1 lies mainly in the outer edge 12 and the cover 20. Specifically, the outer edge 12 of the pen holding device 1a differs from the outer edge 12 of the pen holding device 1 in that the protuberances 14 and the recesses 11a are absent. In other points of shape, the outer edge 12 of the pen holding device 1a is the same as the outer edge 12 of the pen holding device 1. In addition, the cover 20 of the pen holding device 1a differs from the cover 20 of the pen holding device 1 in the shape appearing on the lower surface side. The structure of the cover 20 of the pen holding device 1a will be described in detail below.

The cover 20 of the pen holding device 1a is formed at its lower surface with a flat portion 28 formed in a flat surface shape, an outer edge 29 erected downwardly along an outer edge of the cover 20 (an outer edge of the flat portion 28), and a projection 24 projecting downwardly from a central portion of the cover 20 (a central portion of the flat portion 28). The projection 24 is provided with a recess 24a, like the projection 24 of the pen holding device 1, but the recess 24a in this modification is a small-sized through-hole through which not the projection 13 of the outer shell 10 but only the pen tip of the electronic pen P can pass.

The outer edge 29 and the projection 24 are provided respectively with a plurality of cutouts 29a (first cutouts) and with a plurality of cutouts 24b (second cutouts), at regular intervals. Each of the cutouts 29a is formed in such a manner as to open in two directions, namely, in a lower surface and an inside surface (a surface facing the projection 24) of the outer edge 29. In addition, each of the cutouts 24b is formed in such a manner as to open in two directions, namely, in a lower surface and an outside surface (a surface facing the outer edge 29) of the projection 24.

The cutouts 29a and the cutouts 24b are in one-to-one correspondence with each other, and one set of the cutouts 29a and 24b corresponding to each other constitute a refill core holder 25 in this modification. The refill core SL is accommodated in the refill core holder 25 in a state in which its one end is accommodated in one of the cutouts 29a and 24b whereas its other end is accommodated in the other of the cutouts 29a and 24b. The positions of the cutouts 29a and 24b in the height direction (the distances from the flat portion 28) are set in such a manner that in the case where the refill core SL is accommodated in the refill core holder 25 in the above-mentioned manner, the longitudinal direction of the refill core SL is parallel to a horizontal direction.

The one set of cutouts 29a and 24b constituting the refill core holder 25 are disposed along a radial direction of the cover 20 as viewed on a top, plan-view basis. Also in this modification, therefore, the refill core holders 25 are disposed radially.

As has been described above, according to the structure of the pen holding device 1a, the refill cores SL can be grasped in the state of being oriented in horizontal directions. As a result, a reduction in the height of the casing 2 can be realized, as compared to the case where the refill cores SL are accommodated in the state of being oriented in the vertical direction. In addition, since the cutouts 29a and 24b function as guides, accommodation of the refill core SL into the refill core holder 25 is facilitated. Further, with the refill core holders 25 disposed radially, detachment and attachment of the refill core SL by the user is facilitated.

What is claimed is:

1. A pen holding device configured to hold an electronic pen which has a first core that is elongated and is replaceable, the pen holder comprising:
    a casing having an electronic pen holder that is configured to hold the electronic pen in an erect state or a laid state; and
    at least one refill core holder which is provided inside the casing and is configured to grasp a second core, which is a refill core for the electronic pen, in a direction different from a longitudinal direction of the electronic pen when the electronic pen holder holds the electronic pen in the erect state.

2. The pen holding device according to claim 1, wherein:
    the electronic pen holder includes an opening into which a pen tip of the electronic pen is inserted and which is configured to hold the electronic pen in the erect state, and
    the at least one refill core holder grasps the refill core in an oblique direction as viewed from the longitudinal direction of the electronic pen when the electronic pen holder holds the electronic pen in the erect state.

3. The pen holding device according to claim 1, wherein:
    the casing has a lid formed with the electronic pen holder at least on an upper surface side thereof, and
    the at least one refill core holder is disposed on a lower surface of the lid.

4. The pen holding device according to claim 3, wherein:
    the casing includes the lid, and a main body to which the lid is detachably attached,
    the lid has an outer shell constituting an outer surface of the casing, and a cover covering a lower surface of the outer shell, and
    the at least one refill core holder includes a recess provided in the cover.

5. The pen holding device according to claim 4, wherein:
    the at least one refill core holder further includes a groove provided in the cover, and
    the recess is provided at a first end of the groove corresponding thereto.

6. The pen holding device according to claim 5, wherein:
    the electronic pen holder includes an opening into which a pen tip of the electronic pen is inserted and which is configured to hold the electronic pen in the erect state,
    the opening is provided in a center of the casing as viewed on a top, plan-view basis, and
    the groove extends in a direction from the opening toward an outside of the lid as viewed on a top, plan-view basis.

7. The pen holding device according to claim 6, wherein the recess is provided at one end, adjacent to the opening, of the groove corresponding thereto.

8. The pen holding device according to claim 7, wherein:
    the cover has a tapered portion formed in a mortar shape with the opening as a center, and
    the groove is provided in the tapered portion.

9. The pen holding device according to claim 8, wherein:
    the recess is formed as a hollow cylinder extending in a direction of the groove from one end, adjacent to the opening, of the groove, and
    an axis of the hollow cylinder is parallel to a top surface of a protuberance formed on the outer shell.

10. The pen holding device according to claim 9, wherein the outer shell has a recess having an inner surface continuous with the top surface of the protuberance.

11. The pen holding device according to claim 8,
    wherein the lid includes a flat portion provided between the tapered portion and an outer edge of the lid,
    wherein a second end of the groove opens in the flat portion.

12. The pen holding device according to claim 5, wherein:
    the outer shell has a protuberance extending along the groove, and
    a top surface of the protuberance constitutes a bottom surface of the groove.

13. The pen holding device according to claim 1, wherein:
    the electronic pen holder includes an opening into which a pen tip of the electronic pen is inserted and which is configured to hold the electronic pen in the erect state,
    the at least one refill core holder includes a plurality of refill core holders,
    the refill core holders are disposed surrounding the opening as viewed on a top, plan-view basis.

14. The pen holding device according to claim 13, wherein:
    each of the plurality of refill core holders has a groove configured to accommodate the refill core therein, and
    the respective grooves of the refill core holders are disposed radially with the opening as a center as viewed on a top, plan-view basis.

15. The pen holding device according to claim 14, wherein:
    the casing has a main body, and a lid which is configured to be attachable to and detachable from the main body and is formed with the opening,
    the lid has a tapered portion formed in a mortar shape with the opening as a center, and
    the respective grooves of the plurality of refill core holders are provided in the tapered portion.

16. The pen holding device according to claim 1, wherein the at least one refill core holder is configured to grasp the refill core such that, when the pen holding device is placed on a horizontal surface, a longitudinal direction of the refill core is parallel to a horizontal direction.

17. The pen holding device according to claim 16, wherein:
    the casing has a lid formed with the electronic pen holder at least on an upper surface thereof,
    the lid has an outer shell constituting an outer surface of the casing, and a cover covering a lower surface of the outer shell,
    the cover is provided with an outer edge extending downwardly along an outer edge of the cover, and a projection extending downwardly from a central portion of the cover,
    the outer edge is formed with a plurality of first cutouts,
    the projection is formed with a plurality of second cutouts, and the second cutouts are in one-to-one correspondence with the first cutouts, and
    each of the plurality of refill core holders includes one set of the first and second cutouts corresponding to each other.

18. A system, comprising:
    an electronic pen which has a first core that is elongated and is replaceable; and
    a pen holding device that includes a casing having an electronic pen holder that is configured to hold the electronic pen in an erect state or a laid state, and at least one refill core holder which is provided inside the casing and is configured to grasp a second core, which is a refill core for the electronic pen, in a direction different from a longitudinal direction of the electronic pen when the holder holds the electronic pen in the erect state.

19. The system according to claim 18, wherein:

the casing has a lid formed with the holder at least on an upper surface side thereof, and the at least one refill core holder is disposed on a lower surface of the lid.

20. The system according to claim 19, wherein:

the casing includes the lid, and a main body to which the lid is detachably attached, the lid has an outer shell constituting an outer surface of the casing, and a cover covering a lower surface of the outer shell, and the at least one refill core holder includes a recess provided in the cover.

* * * * *